Oct. 16, 1951 C. H. HART 2,571,239
GLASS DRAWING MACHINE BEARING SUPPORT
Filed Sept. 10, 1945 4 Sheets-Sheet 1
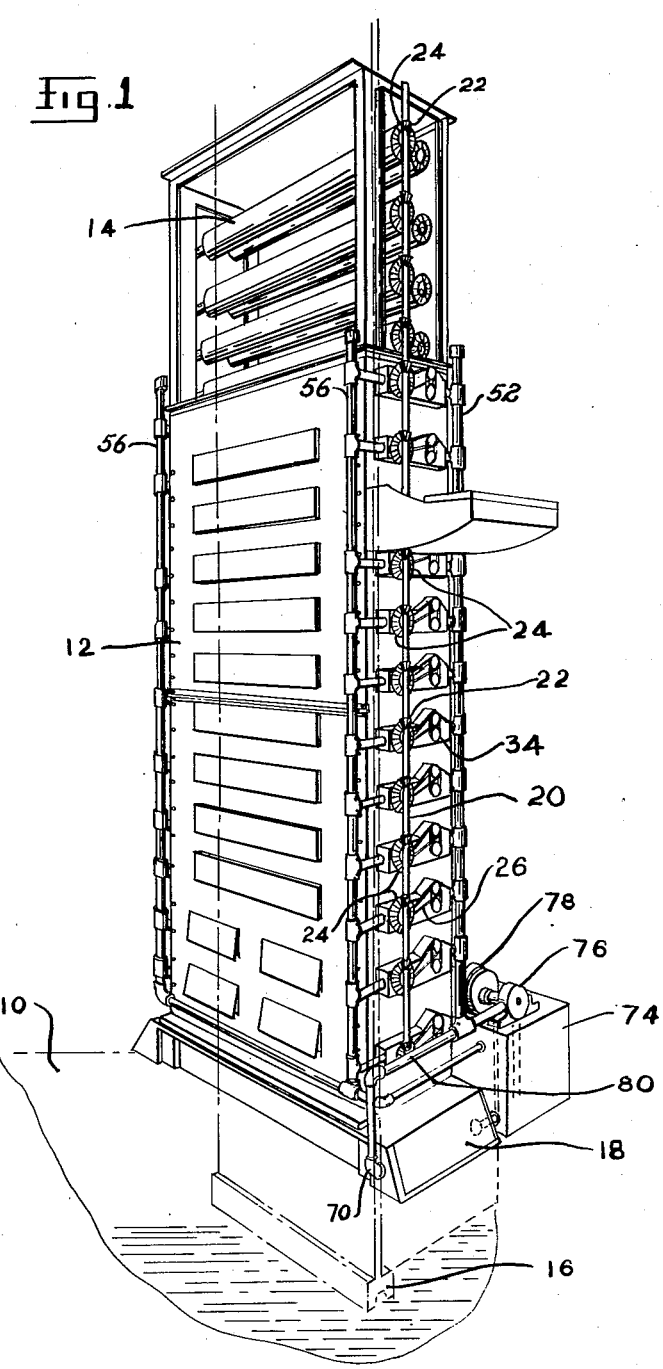
INVENTOR
CHARLES H. HART
BY
Toulmin & Toulmin
ATTORNEYS Oct. 16, 1951  C. H. HART  2,571,239
GLASS DRAWING MACHINE BEARING SUPPORT
Filed Sept. 10, 1945  4 Sheets-Sheet 2
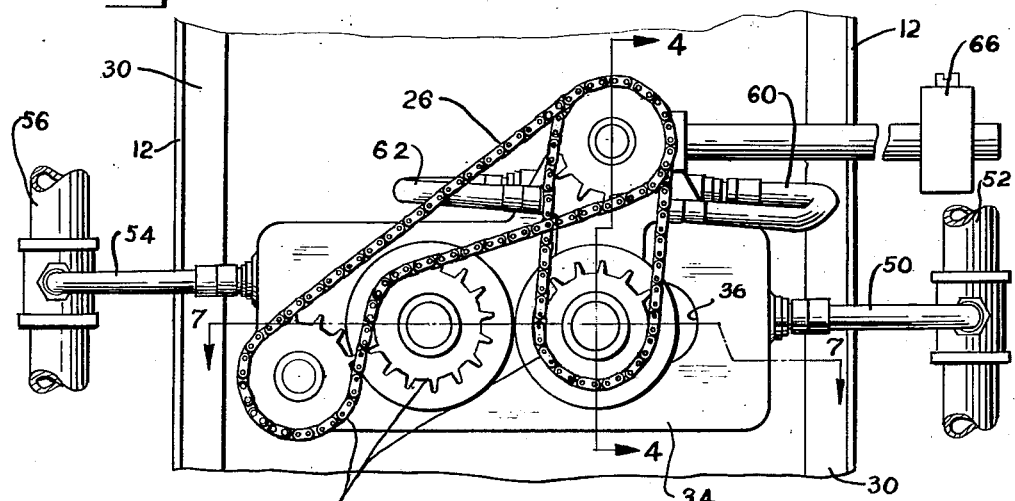
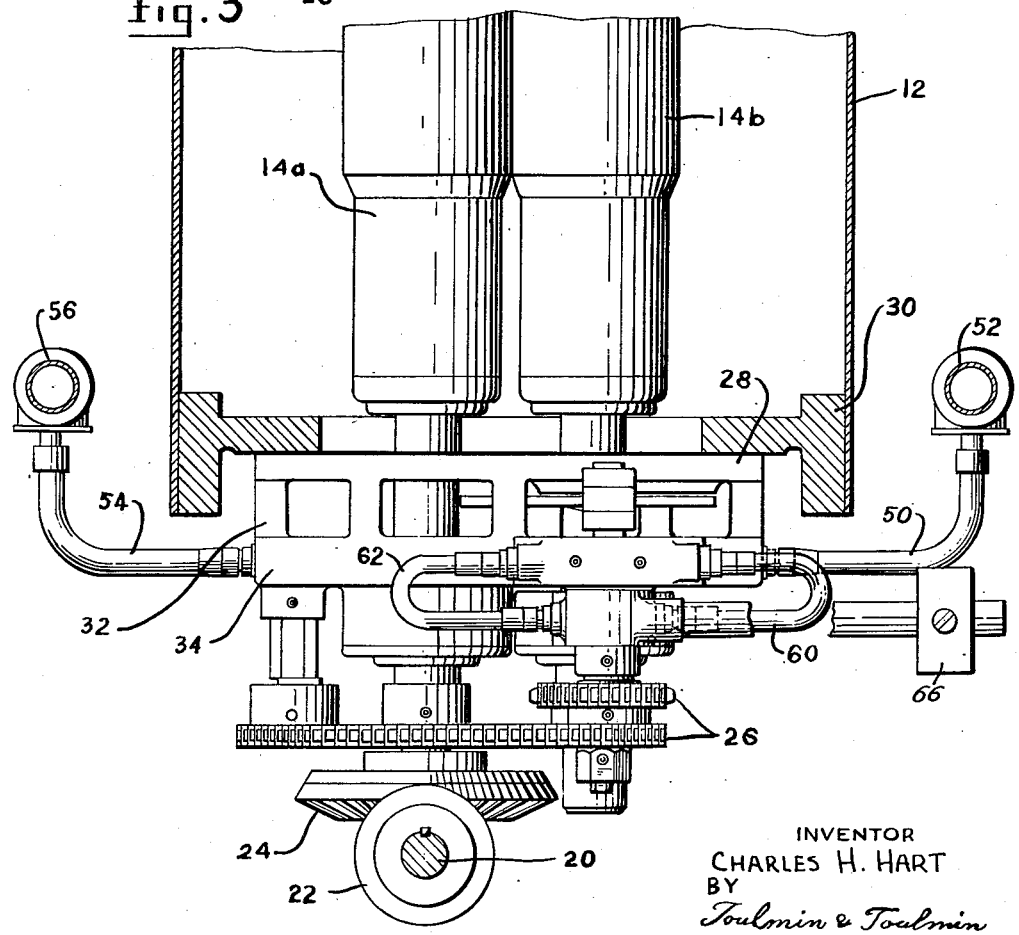
INVENTOR
CHARLES H. HART
BY
Toulmin & Toulmin
ATTORNEYS

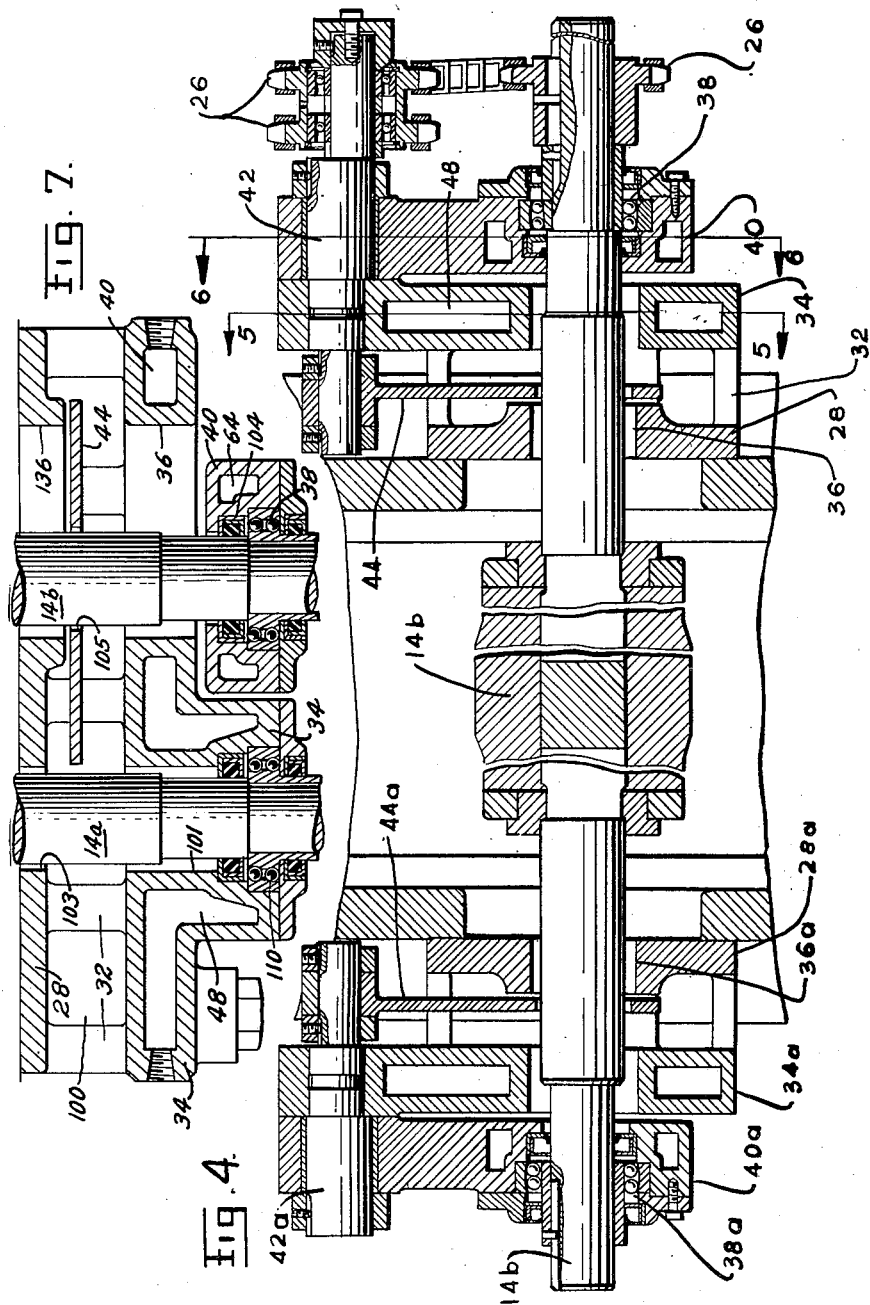

Oct. 16, 1951  C. H. HART  2,571,239
GLASS DRAWING MACHINE BEARING SUPPORT
Filed Sept. 10, 1945  4 Sheets-Sheet 4
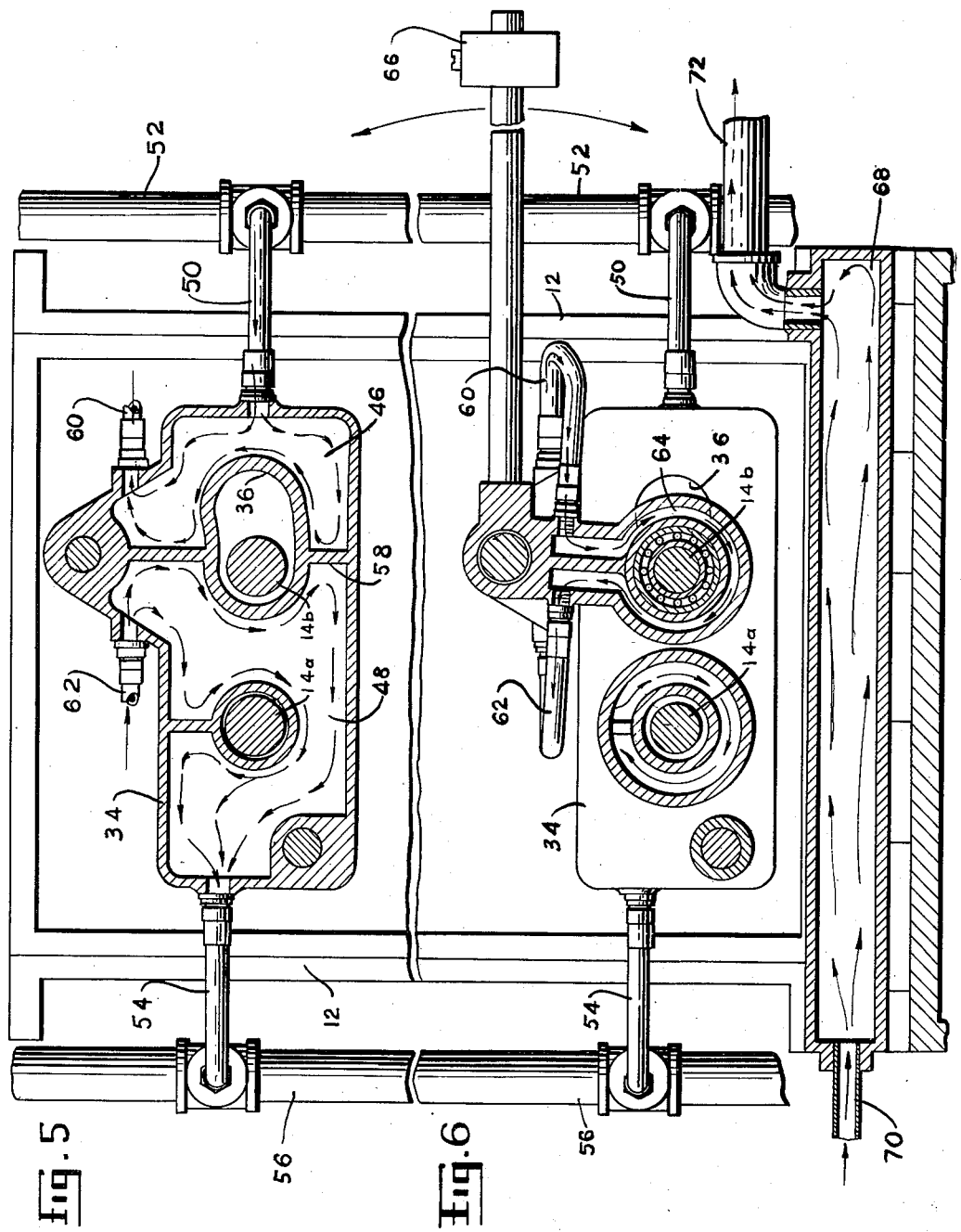
INVENTOR
CHARLES H. HART
BY
Toulmin & Toulmin
ATTORNEYS Patented Oct. 16, 1951

2,571,239

UNITED STATES PATENT OFFICE 2,571,239

GLASS DRAWING MACHINE BEARING SUPPORT

Charles H. Hart, Clarksburg, W. Va., assignor to Hart Bros. Machine Co., Clarksburg, W. Va., a corporation of West Virginia Application September 10, 1945, Serial No. 615,254

8 Claims. (Cl. 49—17)

This invention relates to glass drawing equipment and particularly, to a glass drawing machine of the Fourcault type.

The particular object of this invention is to improve the operation of such a machine by increasing the length of service of the rolls thereof.

Another object is to provide for cooled journal boxes for the rolls of the machine.

Still another object is to provide means for cooling the journal of the movable or swinging roll in a Fourcault type glass drawing machine.

Another object is to provide a cooled bearing type glass drawing machine in which the cooling effect on the bearings is substantially without effect on the machine proper.

Still another object is to provide, in a Fourcault type glass drawing machine, apparatus for maintaining the journal boxes which support the ends of the rolls at substantially independent temperatures from the glass drawing compartment and the rollers therein.

Still another object is to provide journal boxes for a glass drawing machine in which the flow of heat from the machine to the journal boxes is inhibited and in which the temperature of the journals is maintained substantially constant by circulating a suitable coolant liquid therethrough.

Still another object is to provide a type of journal box for a Fourcault glass drawing machine which maintains and circulates a protective blanket of air between the machine proper and the said journal boxes.

These and other objects and advantages will become more apparent upon reference to the accompanying drawings in which:

Figure 1 is a perspective view of a machine constructed according to my invention;

Figure 2 is a side elevation of a portion of the machine showing the location of the journal boxes and coolant connections;

Figure 3 is a horizontal section of the mechanism shown in Figure 2; with parts being shown in plan;

Figure 4 is a vertical section through the machine, partly broken away and parts being shown in elevation, and is indicated by the line 4—4 on Figure 2; and Figures 5 and 6 are sectional views taken on the lines 5—5 and 6—6 respectively, of Figure 4 and show the cooling passages of the journal box at different levels thereof.

Figure 7 is a horizontal cross sectional view taken along line 7—7 of Figure 2.

Referring to the drawings, Figure 1 illustrates a general view of a Fourcault type machine which is located over the work pit of a glass melting furnace generally indicated at 10.

The machine comprises a frame 12 mounting a plurality of rollers 14 which draw a sheet of glass upwardly from the furnace to the top of the machine where it is cut off, trimmed, inspected and sorted.

Within the work pit is a clay block at 16 having a slit therein through which the molten glass passes to the machine. At the base of the machine at 18 is an annealing box comprising gas burners which maintains a predetermined temperature in the box and which also supplies heat to the frame 12 which is known as a lehr.

The rolls 14 within the lehr 12 comprise a fixed roll 14a and a swinging roll 14b which is movable in order to accommodate different thicknesses of glass. A vertical shaft 20 having the bevel gears 22 thereon drives the bevel gears 24 on the shafts of the rolls 14a while the rolls 14b are driven through a sprocket and chain arrangement, generally indicated at 26, from the shaft of the roll 14a.

The maintaining of the temperature within the lehr 12 is of the utmost importance in maintaining the quality and thickness of the glass sheet. Also, inasmuch as it is of the utmost advantage to maintain a glass melting furnace in continuous operation, it is extremely desirable to maintain the drawing machines associated therewith in continuous operation. This is not only a matter of economy but a matter of maintaining the composition of the glass within the necessary limits and holding its physical properties at the desired level of excellence.

The glass within the melting furnace is approximately 1860° F. and the temperature of the sheet as it is drawn gradually decreases until it has cooled to the point that it may be handled as it is cut off at the top of the machine. Temperatures of this order are harmful to the bearings which support the rolls. To inhibit as much as possible the transmission of heat to the shaft bearings, the bearings are carried in a journal box structure that is at least partially thermally isolated from the main part of the machine. The journal box structure consisting of the bearing boxes for the said bearings provides at least partial thermal isolation of the bearing boxes from the main part of the machine. For example, the boxes 34 for the bearings 110 for the rolls 14a are formed with a supporting plate or mounting plate as at 28 which is secured to the side member 30 of the machine frame. Connected to the plate 28 by a series of ribs or reduced area members 32 is the box 34 having the wall 101 forming a closed passage through the box 34 which supports the bearings 110 for the shaft of the roll 14a and through which hollow box or frame there is passed a cooling fluid. The ribs 32 provide passages 100 between the plate 28 and the box or frame 34 through which air passes.

The box 34 and the plate 28 are provided with wall means slotted as at 36 and 136 respectively to provide passage means therein to permit the shaft of the roll 14b to extend therethrough The plate 28 also has an opening 103 aligned with the passage formed by the wall 101 to permit the shaft of the roll 14a to extend therethrough. The shaft of the roll 14b is journalled in the bearing 38 in the box or hollow frame 40 which is a part of the journal box structure and is pivotally supported on a shaft 42 passing through the box 34. The box or frame 40 has a wall 104 forming a closed passage that receives the bearing 38 for the shaft 14b. The inner end of the shaft 42 carries a plate 44 as a part of the journal box structure which serves to close the opening 136 in the plate 28. The plate 44 has a passage 105 aligned with the passages 36 and 136 through which the shaft for the roll 14b passes, the plate 44 being mounted on the shaft 42 for movement of the plate with the swinging roll 14b.

As indicated in Figures 5 and 6, the box 34 comprises a relatively thin walled frame having a cooling passage 46 at the right end and a passage 48 at the left end thereof. Coolant fluid is delivered to the passage 46 by a pipe 50 from a header 52 while cooling fluid is taken from the passage 48 by a pipe 54 and discharged into a header 56.

The cooling passages 46 and 48 are divided by a rib 58 and the discharge of fluid from the passage 46 takes place through a flexible pipe 60 and the supply of fluid to the passage 48 is through a flexible pipe 62.

Referring to Figure 6, it will be noted that the flexible pipe 60 connects with the cooling passage 64 in the box 40 to supply cooling fluid thereto while the pipe 62 connects to the opposite side of the said passage to conduct cooling fluid therefrom. Thus, by continuously supplying coolant through the header 52 and pipe 50 to the passage 46 a circulation thereof obtains which is indicated by the arrows in Figures 5 and 6. By providing the flexible pipe 60 and 62, the swinging movement of the roll 14b is uninhibited and it may freely swing under the influence of the glass sheet and the adjustable counterweight 66.

The spacing of the box 34 from the plate 28 by the ribs 32 provides for an insulating air space between the lehr and the roll journals which substantially retards the flow of heat therebetween. This blanket of air is movable vertically by convection and, therefore, also serves to cool the roll shafts and the journal boxes.

There may be provided also a cooling passage 68 adjacent the base of the machine which is supplied with coolant fluid from a pipe 70 and which exhausts coolant fluid through a pipe 72.

Referring to Figure 1, the supply of coolant may be drawn from the sump 74 by a pump 76 which is driven by a motor 78 and delivered through a pipe 80 to the pipes 52 and 70. Optionally, the supply of coolant may come from any other source and may be refrigerated if desired in order to maintain the necessary temperatures at the roll shaft journals.

It will be understood that the opposite ends of the roll shafts are similarly supported in antifriction bearings which are mounted in cooling boxes which receive coolant fluid in parallel flow to that in connection with the bearing boxes already described. In Figure 4 the portions of the bearing boxes at the left end of the view are identified by the same reference numerals previously employed with the addition of a subscript a.

While this invention has been described, and is particularly useful in the usual type Fourcault machine employing the upright lehr and asbestos covered rolls as illustrated, it will be understood that this invention is not necessarily limited thereto but may be employed with advantage in any instance where it is desired to maintain bearings in good working order and at the most favorable operating temperatures when they must necessarily be mounted adjacent a machine part which operates at elevated temperatures.

While the apparatus disclosed and described herein constitutes a preferred form of the invention, it will be understood that the apparatus is capable of alteration without departing from the spirit of the invention, and that all modifications that fall within the scope of the appended claims are intended to be included herein.

I claim:

1. In a glass drawing machine comprising a fixed roll and a second roll swingable relative thereto; bearings for rotatably supporting the shafts of said rolls and a journal box structure mounting said bearings; said journal box structure comprising; a supporting plate for securing said journal box structure to the machine; a first hollow frame mounting the bearing for the fixed roll; a second hollow frame pivoted on said first frame and mounting the bearing for the swingable roll; reduced area members supporting said first frame on said supporting plate; and means for passing coolant fluid through said hollow frames, said means including a flexible connection communicating between said hollow frames.

2. In a glass drawing machine a bearing support mounting cooperating rolls; one of said rolls being fixed and the other being swingable relative to the fixed roll; said bearing support including a mounting plate; a first hollow frame supporting and including a bearing for the fixed roll; reduced area members interconnecting said first frame with said mounting plate and spacing it therefrom; a second hollow frame supporting and including a bearing for said swingable roll; means pivotally mounting said second frame on said first frame; and means forming fluid flow passages interconnecting said first and second frames for passing coolant fluid serially through said hollow frames to maintain the temperature of said bearings substantially constant.

3. In a glass drawing machine a bearing support mounting cooperating rolls; one of said rolls being swingable; said bearing support including a mounting plate adapted to be secured to said machine; a first hollow frame including a roll bearing spaced from said plate and supported thereon by reduced area members, said frame having an internal partition intermediate the ends thereof; a second hollow frame including means pivotally supporting the same on said first frame and further including a bearing for said swingable roll; conduit means for introducing coolant fluid into one end of said first frame; flexible conduit means for withdrawing coolant fluid from said one end and for passing it to said second frame and thence to the other end of said first frame; and exhaust conduit means for exhausting the coolant from the other end of said first frame.

4. In a glass drawing machine having fixed rolls and swingable rolls cooperating with the fixed rolls; means supporting bearings of the rolls and located at opposite ends of the rolls of the machine comprising; first hollow frames supported on said machine and spaced therefrom in substantial thermal isolation from said machine and forming supports for bearings of the fixed rolls; second hollow frames pivotally supported on each of said first frames and forming supports for bearings of the swingable rolls; said first frame having a wall therein arranged to form a passage aligned with the bearing support of the second frame, and means for passing coolant fluid in parallel flow through said hollow frames for maintaining the temperature of all of the bearings of said machine substantially constant.

5. In a bearing support structure for cooperating rolls of a glass drawing machine in which one of the rolls is swingable relative to the other, a mounting plate, a first hollow frame having wall means therein forming a closed passage through the said frame, a bearing mounted in said passage, an opening in said mounting plate aligned with said passage, reduced area members connecting said first frame and said mounting plate spacing it therefrom and providing passages for circulation of cooling fluid between said plate and said frame, a second hollow frame having a wall providing a closed passage therethrough, a bearing in said passage, means projecting from said first frame forming pivot means on which said second frame is mounted for movement relative to said bearing in said first frame, wall means in said first frame forming a second passage therethrough aligned with said passage in said second frame, said mounting plate including a passage aligned with said last mentioned passage in said first frame, and means forming conduit means interconnecting the said frames for circulation of cooling fluid therethrough.

6. In a bearing support structure for cooperating rolls of a glass drawing machine in which one of the rolls is swingable relative to the other, a mounting plate, a first hollow frame having wall means therein forming a closed passage through the said frame, a bearing mounted in said passage, an opening in said mounting plate aligned with said passage, reduced area members connecting said first frame with said mounting plate spacing it therefrom and providing passages for circulation of cooling fluid between said plate and said frame, a second hollow frame having a wall providing a closed passage therethrough, a bearing in said passage, means projecting from said first frame forming pivot means on which said second frame is mounted for movement relative to said bearing in said first frame, wall means in said first frame forming a second passage therethrough aligned with said passage in said second frame, said mounting plate including a passage aligned with said last mentioned passage in said first frame, a closure plate member positioned between said mounting plate and said first frame and having a passage therethrough aligned with said second mentioned passages in said mounting plate and said first frame, said closure plate being mounted on said means projecting from said first frame for movement across the said second mentioned passages in said mounting plate and said first frame.

7. In a bearing support structure for cooperating rolls of a glass drawing machine in which one of the rolls is swingable relative to the other, a mounting plate, a first hollow frame having wall means therein forming a closed passage through the said frame, a bearing mounted in said passage, an opening in said mounting plate aligned with said passage, reduced area members connecting said first frame and said mounting plate spacing it therefrom and providing passages for circulation of cooling fluid between said plate and said frame, a second hollow frame having a wall providing a closed passage therethrough, a bearing in said passage, means projecting from said first frame pivotally mounting said second frame on said first frame on the side thereof opposite to that adjacent said mounting plate for movement relative to said bearing in said first frame, wall means in said first frame forming a second passage therethrough aligned with said passage in said second frame, said mounting plate including a passage aligned with said last mentioned passage in said first frame, and means forming conduit means interconnecting the said frames for circulation of cooling fluid therethrough.

8. In a bearing support structure for cooperating rolls of a glass drawing machine in which one of the rolls is swingable relative to the other, a mounting plate, a first hollow frame having wall means therein forming a closed passage through the said frame, a bearing in said passage in the end thereof opposite to the end adjacent said mounting plate, an opening in said mounting plate aligned with said passage, reduced area members connecting said first frame with said mounting plate spacing it therefrom and providing passages for circulation of cooling fluid between said plate and said frame, a second hollow frame having a wall providing a closed passage therethrough, a bearing in said passage, means projecting from said first frame forming pivot means on which said second frame is mounted for movement relative to said bearing in said first frame, wall means in said first frame forming a second passage therethrough aligned with said passage in said second frame, said mounting plate including a passage aligned with said last mentioned passage in said first frame, and means forming conduit means interconnecting the said frames for circulation of cooling fluid therethrough.

CHARLES H. HART.

REFERENCES CITED

The following references are of record in the file of this patent:

UNITED STATES PATENTS

| Number | Name | Date |
| --- | --- | --- |
| 1,509,964 | McCarty | Sept. 30, 1924 |
| 1,514,385 | Hitchcock | Nov. 4, 1924 |
| 1,615,834 | Gelstharp | Feb. 1, 1927 |
| 1,992,998 | Drake | Mar. 5, 1935 |
| 2,267,604 | Drake et al. | Dec. 23, 1941 |
| 2,388,503 | Steinle et al. | Nov. 6, 1945 |

FOREIGN PATENTS

| Number | Country | Date |
| --- | --- | --- |
| 379,161 | Great Britain | Aug. 25, 1932 |